United States Patent
Rehrl et al.

(10) Patent No.: US 11,149,676 B2
(45) Date of Patent: Oct. 19, 2021

(54) TWO-STROKE INTERNAL COMBUSTION ENGINE

(71) Applicant: KTM AG, Mattighofen (AT)

(72) Inventors: Christian Rehrl, Jeging (AT); Helmut Drochner, Schalchen (AT); Christian Mayrhofer, Kirchberg (AT); Stefan Spatzenegger, Pfaffstaett (AT); Christian Rathgeb, Thalheim (AT); Michael Derntl, St. Georgen an der Gusen (AT); Bernd Holzleitner, Schalchen (AT); Peter Gorbach, Obertrum am See (AT); Martin Forster, Ranshofen (AT); Michael Viertlmayr, Obertrum (AT)

(73) Assignee: KTM AG, Mattighofen (AT)

( * ) Notice: Subject to any disclaimer, the term of this patent is extended or adjusted under 35 U.S.C. 154(b) by 47 days.

(21) Appl. No.: 16/539,445

(22) PCT Filed: Feb. 9, 2018

(86) PCT No.: PCT/EP2018/053275
§ 371 (c)(1),
(2) Date: Aug. 13, 2019

(87) PCT Pub. No.: WO2018/146251
PCT Pub. Date: Aug. 16, 2018

(65) Prior Publication Data
US 2020/0040838 A1    Feb. 6, 2020

(30) Foreign Application Priority Data
Feb. 13, 2017   (DE) .................... 10 2017 102 792.0

(51) Int. Cl.
*F02D 41/30* (2006.01)
*B62K 11/04* (2006.01)
(Continued)

(52) U.S. Cl.
CPC .......... *F02D 41/3094* (2013.01); *B62K 11/04* (2013.01); *F02B 33/04* (2013.01);
(Continued)

(58) Field of Classification Search
CPC ........ F02D 41/3094; F02D 41/34; F02D 9/08; F02D 2200/021; F02D 2400/04;
(Continued)

(56) References Cited

U.S. PATENT DOCUMENTS 2,021,744 A * 11/1935 Perkins .................... F02B 19/08
123/261
2,204,068 A * 6/1940 Chapman ................ F02B 19/08
123/265
(Continued)

FOREIGN PATENT DOCUMENTS

CN       1156789 A       8/1997
CN     105917106 A       8/2016
(Continued)

OTHER PUBLICATIONS

Author Unknown; "2-Stroke TPI: Conspiracy Theory," Dirt Rider Downunder, Jul. 24, 2018, New Zealand; available at: https://www.drd.co.nz/2-stroke-tpi-conspiracy-theory/.
(Continued)

*Primary Examiner* — Mahmoud Gimie
(74) *Attorney, Agent, or Firm* — Rod D. Baker (57) ABSTRACT

A two-stroke internal combustion engine having at least one cylinder provided with a combustion chamber and an outlet and having a crank housing provided with a crank shaft. The housing is flow-connected to the combustion chamber via at least one transfer port, and the internal combustion engine is formed to inject fuel into the transfer port, against the transfer port from the crank housing into the combustion chamber; the internal combustion engine has at least one
(Continued)

cylinder having two injectors, and fuel can be introduced by means of only one injector with a first engine load and by means of the two injectors with a second engine load.

18 Claims, 9 Drawing Sheets

(51) Int. Cl.
*F02B 33/04* (2006.01)
*F02B 75/02* (2006.01)
*F02D 9/08* (2006.01)
*F02D 41/34* (2006.01)
*F02M 61/14* (2006.01)
*F02M 61/18* (2006.01)

(52) U.S. Cl.
CPC ............... *F02B 75/02* (2013.01); *F02D 9/08* (2013.01); *F02D 41/34* (2013.01); *F02M 61/14* (2013.01); *F02M 61/18* (2013.01); *F02B 2075/025* (2013.01); *F02D 2200/021* (2013.01); *F02D 2400/04* (2013.01)

(58) Field of Classification Search
CPC .... B62K 11/04; F02B 75/02; F02B 2075/025; F02M 61/14; F02M 61/18
USPC ...................................................... 123/73 B
See application file for complete search history.

(56) References Cited

U.S. PATENT DOCUMENTS

| | | | |
|---|---|---|---|
| 5,144,919 | A | 9/1992 | Franz |
| 5,503,119 | A | 4/1996 | Glover |
| 6,691,649 | B2 | 2/2004 | Zauner et al. |
| 7,089,892 | B1 | 8/2006 | Hosaluk et al. |
| 7,168,401 | B2 | 1/2007 | Johnson |
| 2002/0011223 | A1* | 1/2002 | Zauner .................... F02B 25/14 123/73 B |
| 2002/0179026 | A1* | 12/2002 | Laimbock ............... F02B 25/20 123/730 |
| 2008/0083381 | A1 | 4/2008 | Kirchberger |

FOREIGN PATENT DOCUMENTS

| | | |
|---|---|---|
| DE | 1 231 482 A | 7/1967 |
| DE | 10 2008 019 157 A1 | 11/2008 |
| DE | 102 20 555 B4 | 6/2013 |
| DE | 102 29 365 B4 | 10/2013 |
| DE | 10 2004 002 161 B4 | 1/2014 |
| EP | 0 302 045 A2 | 2/1989 |
| EP | 0 980 969 A2 | 2/2000 |
| JP | S60-147549 A | 8/1985 |
| JP | S61-53427 A | 3/1986 |
| JP | S61-123743 A | 6/1986 |
| JP | H5-65860 A | 3/1993 |
| JP | 2000-283008 A | 10/2000 |
| JP | 2005-90369 A | 4/2005 |
| JP | 2010-25083 A | 2/2010 |
| JP | 2010-25084 A | 2/2010 |
| WO | 2006007614 A1 | 1/2006 |

OTHER PUBLICATIONS

GerbilGronk; "EFI Yamaha YZ250," Youtube video, May 13, 2013, USA; available at: https://www.youtube.com/watch?v=hOGZ5llowoU.
International Preliminary Report on Patentability, International Patent Application No. PCT/EP2018/053275; dated Aug. 13, 2019.
Canadian Intellectual Property Office, first Office Action on Canadian Patent Application No. 3,053,007 (Canadian counterpart to U.S. Appl. No. 16/539,445); dated Nov. 18, 2020.
People's Republic of China, National Intellectual Property Administration, First Office Action on Chinese Patent Application No. 201880021883.0 (Chinese counterpart to U.S. Appl. No. 16/539,445), dated Nov. 19, 2020 (Chinese language).
People's Republic of China, National Intellectual Property Administration, Notice of First Office Action on Chinese Patent Application No. 201880021883.0 (Chinese counterpart to U.S. Appl. No. 16/539,445), dated Nov. 19, 2020 (English translation).
Bairui Patent Attorneys (China), Summary of First Office Action on Chinese Patent Application No. 201880021883.0 (Chinese counterpart to U.S. Appl. No. 16/539,445), (English language).
Intellectual Property India, "Examination Report" office action on Indian Patent Application No. 201947032261 (Indian counterpart to U.S. Appl. No. 16/539,445); dated Apr. 22, 2021.

\* cited by examiner

TWO-STROKE INTERNAL COMBUSTION ENGINE

CROSS-REFERENCE TO RELATED APPLICATIONS

This application claims priority to Patent Cooperation Treaty Patent Application No PCT/EP2018/053275 filed 9 Feb. 2018, which claims priority to German Patent Application No. 10-2017-102-792.0, filed 13 Feb. 2017; the contents of both these prior applications are incorporated herein by reference.

BACKGROUND OF THE INVENTION

Field of the Invention

The present invention relates to a two-stroke internal combustion engine having at least one cylinder provided with a combustion chamber and an outlet, and having a crank housing provided with a crank shaft, said crank housing being flow communicated to the combustion chamber via at least one transfer port, and the internal combustion engine is formed for injecting fuel into the transfer port generally against the overflow direction from the crank housing into the combustion chamber.

Description of the Background Art

Two-stroke internal combustion engines have been known for a long time, and are also subject to a corresponding development to avoid hydrocarbon (HC) emissions in exhaust gas emerging as a result of flushing losses, even if the two-stroke internal combustion engine or two-stroke engine has been replaced in the meantime by the four-stroke engine in many fields, yet because of its high power density, the two-stroke internal combustion engine is still very interesting from a technological perspective. Indeed, in particular in fields in which there is a dependence on a high power yield with low mass, i.e., for example in the field of the drive source for motorcycles and, here, in particular in the field of off-road motorcycles, which are here only mentioned as an example.

A two-stroke internal combustion engine is known from U.S. Pat. No. 7,168,401 B2, which has two injectors for supplying fuel to the cylinder of the engine, of which a first injector can inject fuel directly into the combustion chamber and the other injector can inject fuel into the transfer port and namely in the direction of the fluid flow flowing out of the crank housing of the engine, through the transfer port in the direction of the combustion chamber. In other words, this means that the fuel is injected into the transfer port in the flow direction.

A two-stroke internal combustion engine is known from German DE 10 2004 002 161 B4, in which a mixture of fuel and lubricating oil is injected via an injection element, which forms at least two injection jots, of which a first injection jet is directed into the transfer port in the flow direction from the crank housing in the direction of the combustion space and a second injection jet is directed in the direction of the crank chamber.

A two-stroke engine is known from German DE 102 29 365 B4, in which the fuel is injected via an injector into a transfer port and indeed into the region below an inlet window or even to the height of the inlet window or overflow window.

A two-stroke internal combustion engine is known from European EP 0 302 045 B2, in which the fuel is injected by means of two injection nozzles onto the piston base and, in the event of high rotational speeds, is injected into the transfer port.

A two-stroke internal combustion engine is known from German DE 10 2008 019 157 A1, in which the fuel is injected against the flow direction from the crank housing into the combustion chamber into the transfer port.

A vehicle having a two-stroke engine is known from U.S. Pat. No. 7,089,892 B1, in which the fuel can be introduced into the crank housing via a first injector and into the transfer port via a second injector and indeed at an angle directed upwards, i.e. seen in the flow direction from the crank housing into the combustion chamber of the internal combustion engine, so not against the flow direction from the crank housing into the combustion space.

A two-stroke engine is known from German DE 102 20 555 B4, in which, when idling, the fuel is injected into the crank housing and, at predetermined control times, into the transfer port and indeed into the end of the transfer port facing towards the combustion chamber, i.e. transversely to the overflow direction.

A two-stroke internal combustion engine is known from U.S. Pat. No. 6,691,649 B2, which functions with two injectors per cylinder, and in which the fuel is injected into the transfer port and indeed in the region of the inlet window from the transfer port to the cylinder and indeed into the air stream which flows from the transfer port into the cylinder.

Finally, a two-stroke combustion engine is known from WO 2006/007614 A1, in which the fuel is injected into the transfer port and indeed generally against the overflow direction from the crank housing into the combustion chamber and in which it thus leads to a mixture formation outside the crank housing of the cylinder.

A two-stroke internal combustion engine is characterized by a high power density and has a high spreading in terms of the fuel necessary for effecting the high power density, thus it needs less fuel in low rotational speed ranges and low load while it has a high fuel need in high rotational speed ranges of high load.

In known two-stroke internal combustion engines, there have been efforts to solve this problem area, at best at the periphery, by the fuel either being injected directly into the combustion chamber in the event of a high fuel demand, or into the region of the transfer port, which is directly connected to the combustion chamber via the overflow window. In the case mentioned first, the fuel is introduced directly into the combustion chamber and, in the case mentioned second, into the combustion chamber generally directly via the overflow window, such that this results in zones with high fuel-air concentration, which indeed complies with the flammability of the mixture, on one hand, yet on the other hand increases the danger of high HC concentrations in the exhaust gas of the engine.

Moreover, if the fuel is introduced with high injection pressures in the combustion chamber because of the only very short time of the opening of the overflow window, then there is the danger that it will result in wall depositions of the injected fuel on the cylinder wall opposite the overflow window in the combustion chamber. This on one hand increases the danger of washing off the two-stroke oil necessary for the operation of the two-stroke engine from the combustion chamber wall—and thus increases the danger of piston jams—and, on the other hand, further increases the HC emissions in the exhaust gas because of the wall depositions of the fuel on the combustion chamber wall.

These dangers still exist even with direct injection of the fuel into the combustion chamber.

SUMMARY OF THE INVENTION
(DISCLOSURE OF THE INVENTION)

An object of the present invention is to create a two-stroke engine which eliminates the problems known in the art. The disclosed apparatus is characterized by a simple construction and avoids two-stroke-typical flushing losses, and can be supplied with fuel as required to achieve a high power yield across the whole load and rotational speed range.

To solve this object, the invention has the features stated in claim 1; advantageous embodiments of this are described in the further claims. The invention also creates a method for operating a two-stroke internal combustion engine according to claim 14 and a motorcycle having a two-stroke internal combustion engine according to the invention.

BRIEF DESCRIPTION OF THE SEVERAL VIEWS OF THE DRAWING

The invention is explained in more detail below by means of the drawings. Here are shown.

DETAILED DESCRIPTION OF THE INVENTION

The invention provides a two-stroke internal combustion engine having at least one cylinder provided with a combustion chamber and an outlet and having a crank housing provided with a crank shaft, said housing being flow-connected to the combustion chamber via at least one transfer port; the internal combustion engine is formed or adapted for injecting fuel into the transfer port generally against the overflow direction out of the crank housing into the combustion chamber, and wherein the internal combustion engine has at least one cylinder having two injectors. Fuel is introducible by means of only one injector with a first engine load and by means of both injectors with a second engine load. Thus, fuel can be introduced by means of only one injector with a first engine load and by means of both injectors with a second engine load.

With the two-stroke internal combustion engine, the fuel is thus not directly injected into the combustion chamber via the injector or the two injectors, such that the problem of washing off lubricating oil from the combustion chamber wall is avoided; it cannot also result in wall deposition of fuel on the combustion chamber wall. By injecting fuel into the transfer port or transfer or overflower or transfer duct by means of an injector or by means of the two injectors into separate transfer ports or also only one common transfer port against the overflow direction from the crank housing in the direction of the inside of the cylinder, a very good fuel processing is achieved by high turbulences in the transfer or overflower, whereby the formation of unburnt hydrocarbons (HC emissions) in the exhaust gas can be counteracted.

Also, by introducing fuel into the transfer or overflower by means of only one injector, it is achieved that a low fuel requirement of the two-stroke engine according to the invention is taken into account—such, for example, when in neutral or in the low load region, namely when the two-stroke engine requires less fuel. This operating range corresponds to the operation of the two-stroke engine according to the invention with a first engine load.

In contrast, if the fuel requirement of the two-stroke engine according to the present invention increases because of a higher load requirement, for example by the user of the motorcycle operated with the two-stroke engine according to the invention, then the operation of the two-stroke engine according to the invention is shifted to the fuel injection by means of two injectors per cylinder; this operating region corresponds to the operation of the two-stroke engine according to the invention with a second engine load, which is higher than the first engine load, in which the fuel is introduced into the transfer or overflower by means of only one injector.

The two-stroke specific high spread is taken into account by the possibility provided according to the invention of introducing fuel into the overflower(s) depending on the engine load. Here, the engine load can be the target engine load, i.e., the engine load which is to be provided by the engine as desired by the user of the engine according to the invention, that is, the work, which the engine is to undertake, in relation to the stroke volume of a cylinder of the engine.

The user of the engine influences the engine load to be delivered by the engine by means of a throttle opening cross-section in the suction air region of the engine. The throttle opening cross-section is determined by the opening of a throttle organ in the suction air region of the engine, wherein (in the simplest case) the throttle organ can be an air slide by means of whose displacement the opening cross-section of the throttle organ is changed; it can also be a throttle valve, whose pivoting around a throttle valve leads to a change of the opening cross-section of the throttle organ.

Thus, a first throttle opening cross-section can correspond to a first engine load, while a second throttle opening cross-section can correspond to a second engine load. The throttle opening cross-section leads to a change of the crank housing pressure to be established in the crank chamber of the crank housing. Switching the operating mode of the combustion engine according to the present invention can take place via the determination of the crank housing pressure using one injector or using two injectors per cylinder. A first crank housing pressure, which corresponds to a first throttle opening cross-section and thus to a first engine load, leads to the fuel being supplied to the engine according to the invention only by means of injecting fuel into an overflower or transfer, while a second crank housing pressure, which corresponds to a second throttle opening cross-section and thus to a second engine load, leads to the fuel being supplied to the engine by means of injecting fuel from two injectors into two overflowers or transfers or into one common overflower or transfer for the two injectors. By switching the operating mode of the internal combustion engine according to the invention from fuel supply with only one injector to fuel supply with the two injectors and from fuel supply with the two injectors to fuel supply with only one injector, the specific fuel requirements of the combustion engine according to the invention can be taken into account depending on the load of the engine.

According to a further aspect of the invention, the internal combustion engine is formed to alternately inject fuel by means of one of the two injectors. In other words, this means that when the amount of fuel for supplying the two-stroke internal combustion engine with the amount of fuel required at the respective operating point is supplied with only one injector, the fuel is supplied by an injector, for example in the course of a crank shaft rotation, and is supplied by the other injector in the course of the next crank shaft rotation. The two injectors are thus used alternatingly for the fuel supply per crank shaft rotation. It is also possible that the fuel is supplied by means of the one injector, for example during a predetermined number of crank shaft rotations, and the fuel is supplied by means of the other injector during a subsequent number of crank shaft rotations.

This approach has the advantage that an optimized fuel amount measurement is achieved with a small engine load and contamination of an injector otherwise not flowed-through with fuel for a longer period of time can be prevented. Such contamination can be the consequence of exhaust fumes, for example, in the crank housing because of blow-by effects or also the consequence of lubricating oil necessary for the operation of the two-stroke internal combustion engine, which enters the crank housing. Such contamination can be avoided by the alternating use of the two injectors even with the supply of fuel by means of only one injector. Possible resin formation or bonding of the injectors can also be prevented in this way by additives or components present in the fuel, and an otherwise unequal distribution of the mechanical load of the two injectors can be avoided.

According to another aspect of the invention, the internal combustion engine is formed to inject fuel during a crank shaft angle, which corresponds to a partial region or part of a complete rotation of the crank shaft, and the partial region or part is about 5 degrees of the crank shaft angle to about 350 degrees of the crank shaft angle, preferably about 10 degrees of the crank shaft angle to about 300 degrees of the crank shaft angle, preferably about 12 degrees of the crank shaft angle to about 305 degrees of the crank shaft angle. In other words, this means that the internal combustion engine according to the invention is formed in such a way that the fuel is injected during a partial region or part of a complete rotation of the crank shaft of 360 degrees of the crank angle, and this partial region or part reaches from a very short window of time of about only 5 degrees of the crank angle to a very long window of time of 350 degrees of the crank angle. Fuel is thus only injected during a very short injection time interval of a complete crank shaft rotation or also during a time interval, which virtually corresponds to a complete rotation of the crank shaft, and thus fuel is injected for almost the entire time duration of a complete crank shaft rotation, whereby fuel can also be pre-stored in the crank chamber of the crank housing.

According to the invention or further aspect of the invention, the injection interval is from about 10 degrees of the crank angle to about 330 degrees of the crank angle, and it has been shown that very good results are obtained with a two-stroke internal combustion engine with a stroke volume of 250 cm$^3$, with an injection interval of from about 12 degrees of the crank angle up to about 305 degrees of the crank angle.

According to another aspect of the invention, the two-stroke internal combustion engine is used for injecting fuel by means of only one injector in a region of the engine load of the combustion engine from about seven percent to about 40 percent of the maximum load of the combustion machine, wherein the value changes depending on the engine speed. The user of the engine according to the invention can influence the load requirement set on the engine by changing the throttle opening cross-section of a throttle organ arranged in the suction air region of the engine, such that, for example with a load requirement of more than about 40 percent of the maximum load, fuel is injected by means of both injectors; while with a load requirement of less than about 40 percent of the maximum load, fuel is injected by means of only one injector, and indeed depending on the respective engine speed. As already mentioned above, the fuel can then be injected in alternating operation respectively by one of the two injectors. Switching the operation with one injector to an operation with two injectors and vice versa thus takes place in the region of about 7 percent to about 40 percent of the load. The dependence of the engine speed here means that the switching time from the operation of the two-stroke internal combustion engine according to the invention with only one injector to the operation with the two injectors per cylinder and the switching of the operation with two injectors to the operation with only one injector—which can then be operated alternately—depends on the engine speed.

With low engine speeds, one injector can suffice for a load up to about 40 percent of the maximum load of the engine, while with high engine speeds it is already switched to the operation with two injectors already from an engine load of about 7 percent of the maximum load, and the engine can be further operated with only one injector in the case of a load requirement of under 7 percent of the maximum load.

According to a further aspect of the invention, the internal combustion engine is formed for injecting fuel while a partial region of the crank shaft angle corresponding to a complete rotation of the crank shaft increasing with increasing speed of the combustion engine. In other words, this means that the time interval, during which fuel is injected by means of one injector or also by means of the two injectors in or into the transfer ports, is longer as the speed of the combustion engine according to the invention increases. For instance, during a greater partial region or part of a complete crank shaft rotation of 360 degrees, fuel is injected with one injector or with the two injectors, whereby fuel is also pre-stored in the crank housing for the operation of the combustion engine depending on the engine speed; fuel is thus also injected into the transfer port(s) when the overflow window from the transfer port into the combustion chamber of the cylinder is sealed by the pistons moving in the cylinder between the bottom dead center (UT) and top dead center (OT).

According to a further aspect of the invention, it is also provided that the internal combustion engine is functionally coupled to, or is also provided with, a control device. The control device is formed to establish a load requirement of the internal combustion engine, and the injection of fuel takes place by means of one injector or the two injectors depending on the load requirement determined. Thus, the target engine load or goal engine load required by the user can be set via the control device, for example via the detection of a throttle opening cross-section of a throttle organ pre-switched for supplying suction air in a flow technical manner—in which it can be a carburetor or a throttle flap, and then, depending on the engine load established, either one injector or the two injectors is actuated by the control device for supplying fuel into the transfer port or the over flow channels.

According to a further aspect of the invention, the internal combustion engine is formed to change the start of the injecting of fuel by means of one injector or the two injectors and/or the time duration of the opening actuation of the injector or the two injectors, depending on the load requirement determined and/or the rotational speed of the internal combustion engine. The internal combustion engine can thus actuate the injectors in such a way that the start of the injecting of fuel into the transfer port or the transfer ports is changed depending on the engine load or the established load requirement and/or the current engine speed of the internal combustion engine. Based on the operating parameters of the internal combustion engine according to the invention which were thus established in this way, this can thus shift and/or shorten and/or lengthen the injection time interval, during which fuel is injected into the transfer port or into the transfer ports, within the available interval of 360 degrees of the crank angle. Shifting the injection interval in the direction early here means that the injection interval is shifted upwards in a region after the top dead center (OT) of the piston on its way in the direction of the bottom dead center (UT) of the piston, i.e., in the direction towards the top dead point (OT); while shifting the injection interval in the direction later means that the injection interval is shifted downwards in a region after the top dead center (OT) of the piston on its way in the direction of the bottom dead center (UT) of the piston, i.e., in the direction towards the lower dead center (UT).

According to a further aspect of the invention, the cylinder is provided with first and second transfer ports, and the second transfer ports are arranged spaced apart further in relation to the outlet than the first transfer ports, and the injectors are arranged for injecting fuel into the second transfer ports. In this way, it is achieved that the flushing losses are minimized because the emergence of short-circuit flow between the first transfer ports and the outlet of the cylinder is reduced or avoided. The danger of such short-circuit flow would increase if the fuel were injected into the transfer ports closer to the outlet. This contributes to the reduction of HC emissions in exhaust fumes of the internal combustion engine according to the invention.

According to a further aspect of the invention, the internal combustion engine has a cylinder vertical axis formed by the longitudinal central axis of the cylinder, and each injector has an injector vertical axis formed by the longitudinal central axis of the injector. The injectors are arranged at an angle between the cylinder vertical axis and the injector vertical axis inclined by from about zero degrees to about 35 degrees, preferably about 14 degrees. In this way, the danger of wall depositions of fuel on the channel walls of the transfer ports is reduced, which contributes to the reduction of unburnt hydrocarbons in the exhaust fumes of the internal combustion engine according to the invention.

According to a further aspect of the invention, the internal combustion engine has a longitudinal central plane enclosing the cylinder vertical axis—an imaginary or virtual longitudinal central plane—and has a transverse central plane standing at right angles with the longitudinal central plane—an imaginary or virtual transverse central plane—and the injectors are arranged inclined at an angle between the longitudinal central plane and the injector vertical axis of from about minus 8 degrees to about plus 33 degrees. Here, the injector can be arranged to be offset backwardly relative to the transverse central plane in the direction away from the outlet by about 15 degrees. This configuration also has the advantage that the fuel introduced by the injectors in the form of a jet cone or injection cone into the transfer port or the transfer ports only slightly comes into contact with, or does not come into contact with, the walls of the transfer port or the transfer ports. Rather, it is dissolved and entrained before such a possible contact by the fluid current flowing in the transfer port or the transfer ports starting from the crank chamber in the direction of the combustion chamber. In turn, this configuration contributes to the formation of unburnt hydrocarbons in the exhaust fumes of the internal combustion engine according to the invention being reduced.

According to a further aspect of the invention, the injectors are arranged quite generally relative to the respective transfer port in such a way that depositions of the fuel injected by the injector into the transfer port are extensively avoided on the wall of the transfer port. In turn, this configuration has the advantage that the formation of fuel particles ending up in the combustion chamber in droplet form from the transfer port is reduced or avoided, whereby the HC emissions in the exhaust fumes can be reduced again. The specific fuel consumption of the two-stroke internal combustion engine according to the invention is thus also reduced.

Finally, according to a further aspect of the invention, the injector generates at least one conical fuel jet, and the injector is aligned in relation to the transfer port to avoid wall depositions of the fuel jet on the wall of the transfer port.

This invention also creates a method for operating a two-stroke internal combustion engine, which has at least one cylinder provided with a combustion chamber and an outlet and has a crank housing provided with a crank shaft, which is flow-connected to the combustion chamber via at least one transfer port. The fuel is injected into the flow channel extensively or predominately against the overflow direction from the crank housing in the combustion chamber, wherein, according to the method according to the invention, the fuel is injected by means of only one injector in the case of a first engine load and by means of the two injectors in the case of a second engine load.

Here, the first engine load is lower than the second engine load, such that, depending on the engine load—i.e., the load of the internal combustion engine or also of a load requirement set by setting a throttle opening cross-section of a throttle organ, which is pre-switched in a flow technical manner over the internal combustion engine according to the invention, of the internal combustion engine according to the invention—the fuel is injected into the transfer port by means of only one injector or the fuel is injected into the transfer ports by means of the two injectors. The operation of the internal combustion engine according to the invention with only one injector or the two injectors can thus be switched forwards and backwards depending on the engine load or the established load requirement, according to which engine load is present or which load requirement is made of the engine.

Figure 1:
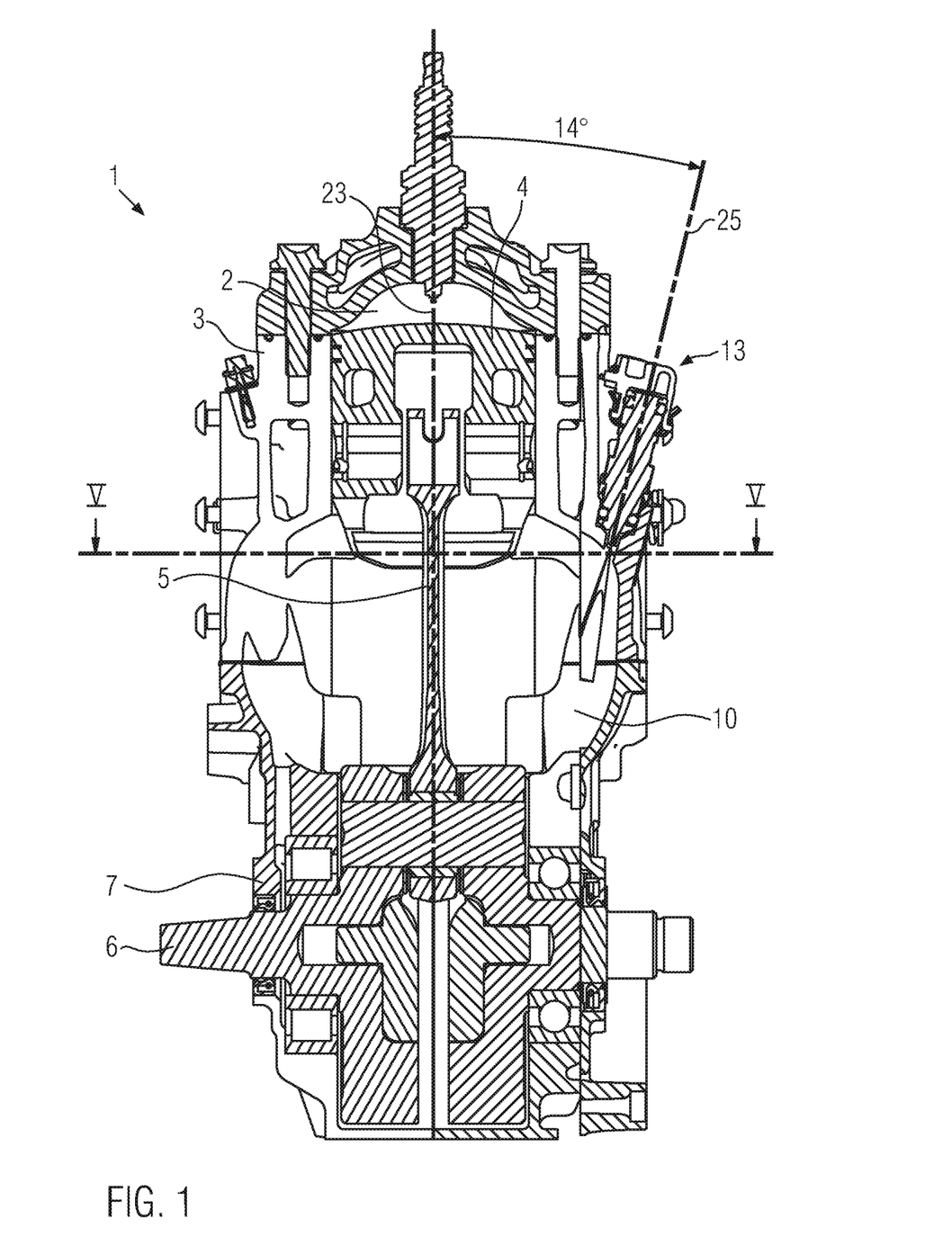
FIG. 1 is a sectional view of a single-cylinder two-stroke internal combustion engine according to the present invention in a cross-sectional depiction according to the line I-I in FIG. 2.
Figure 2:
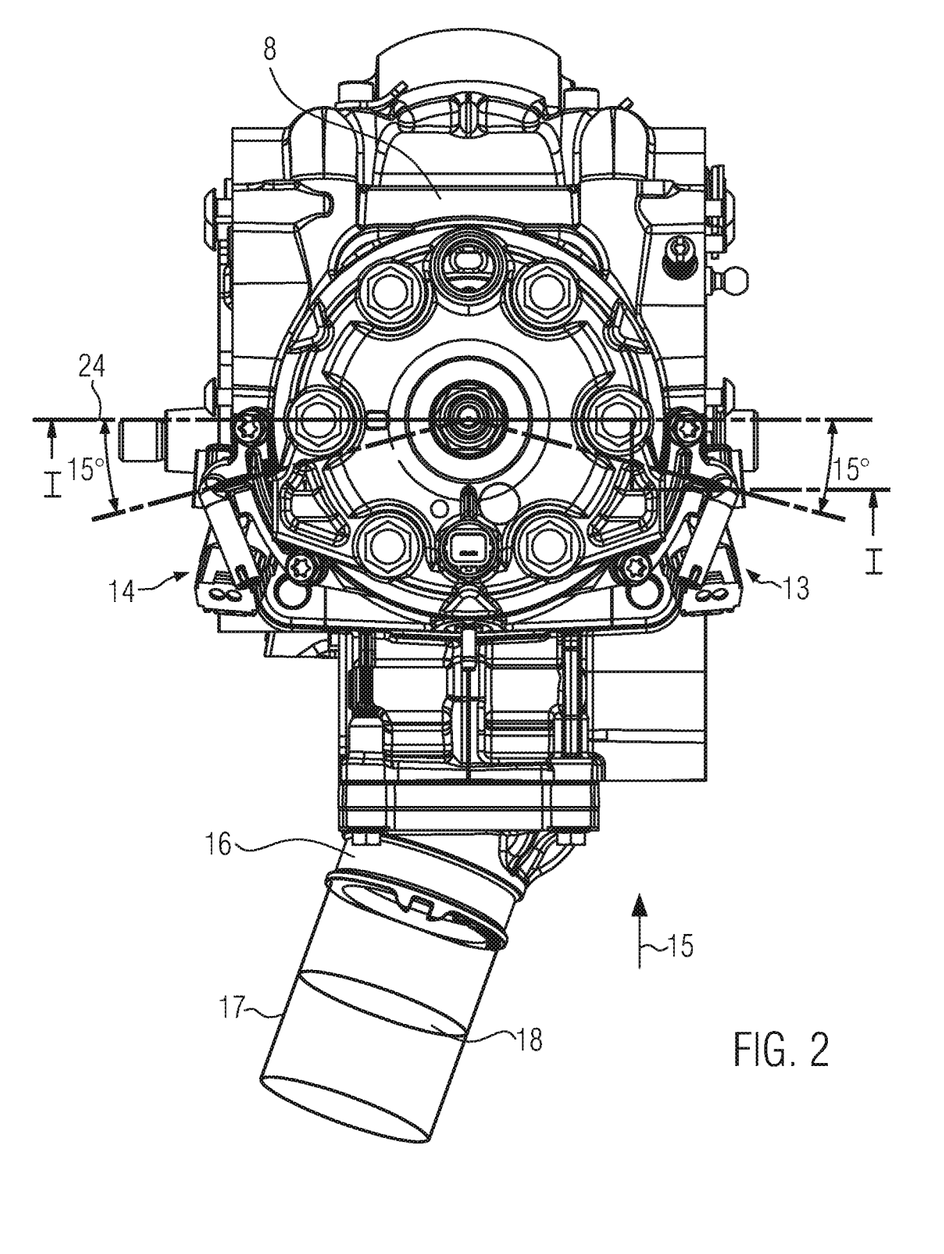
FIG. 2 a top view of the embodiment seen in FIG. 1.

FIG. 1 of the drawings shows a cross-sectional view, along line I-I according to FIG. 2, through a two-stroke internal combustion engine 1 according to an embodiment according to the present invention. The two-stroke internal combustion engine or the engine 1 has a combustion chamber 2, which is formed in a cylinder 3 above a piston 4, which is coupled to the crank shaft 6 via a connecting rod 5, which is rotatably received in a crank housing 7. The cylinder 3 is provided with an outlet 8 visible by means of FIG. 2, via which the exhaust fumes can be disposed of. Further details of the engine 1, such as a clutch and an alternator and engine housing cover, for example, and the like are not depicted for the sake of simplifying the drawings but are of course present in an engine 1 operationally ready to install.

Figure 3:
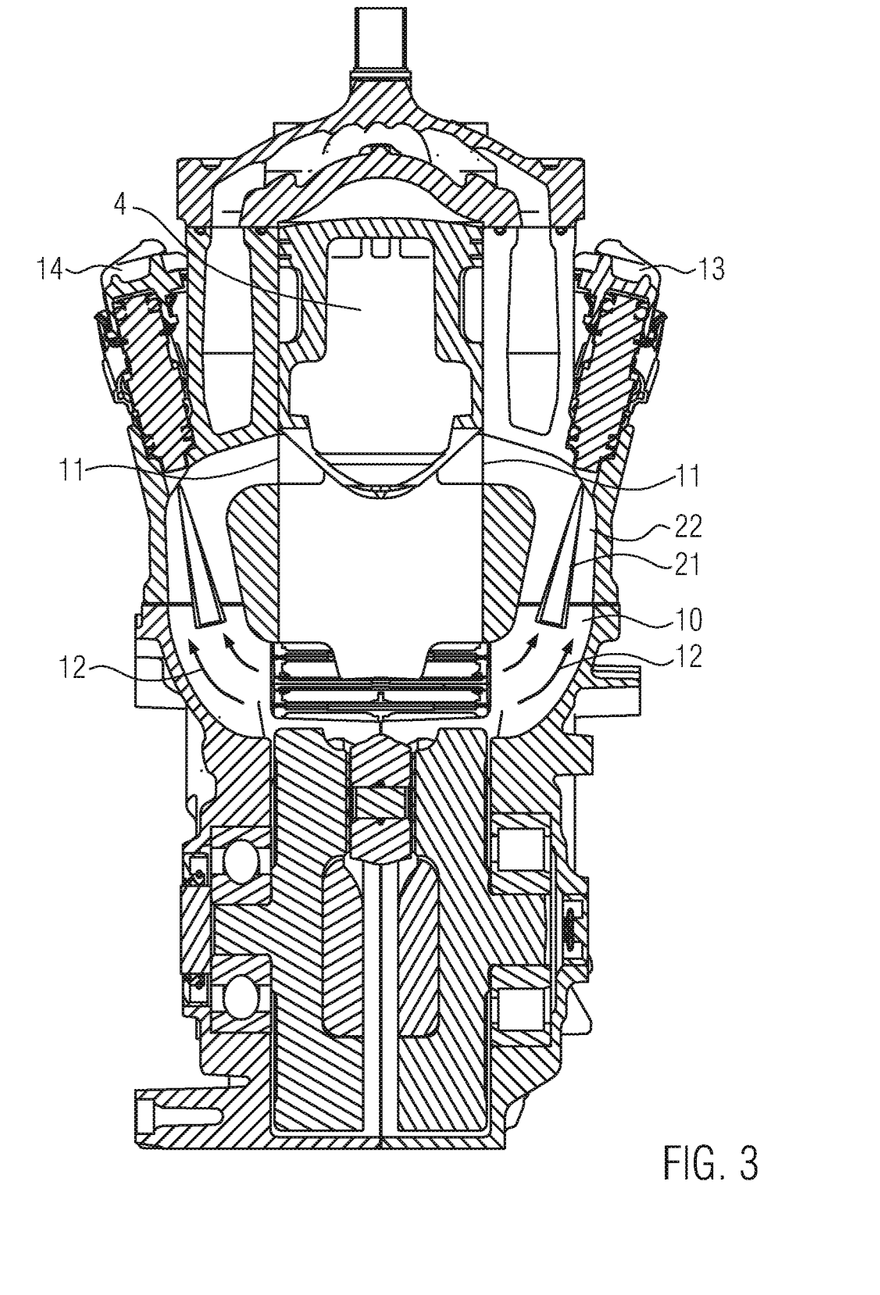
FIG. 3 is a view similar to that of FIG. 1, illustrating the spraying image or jet image of an injector.
Figure 5:
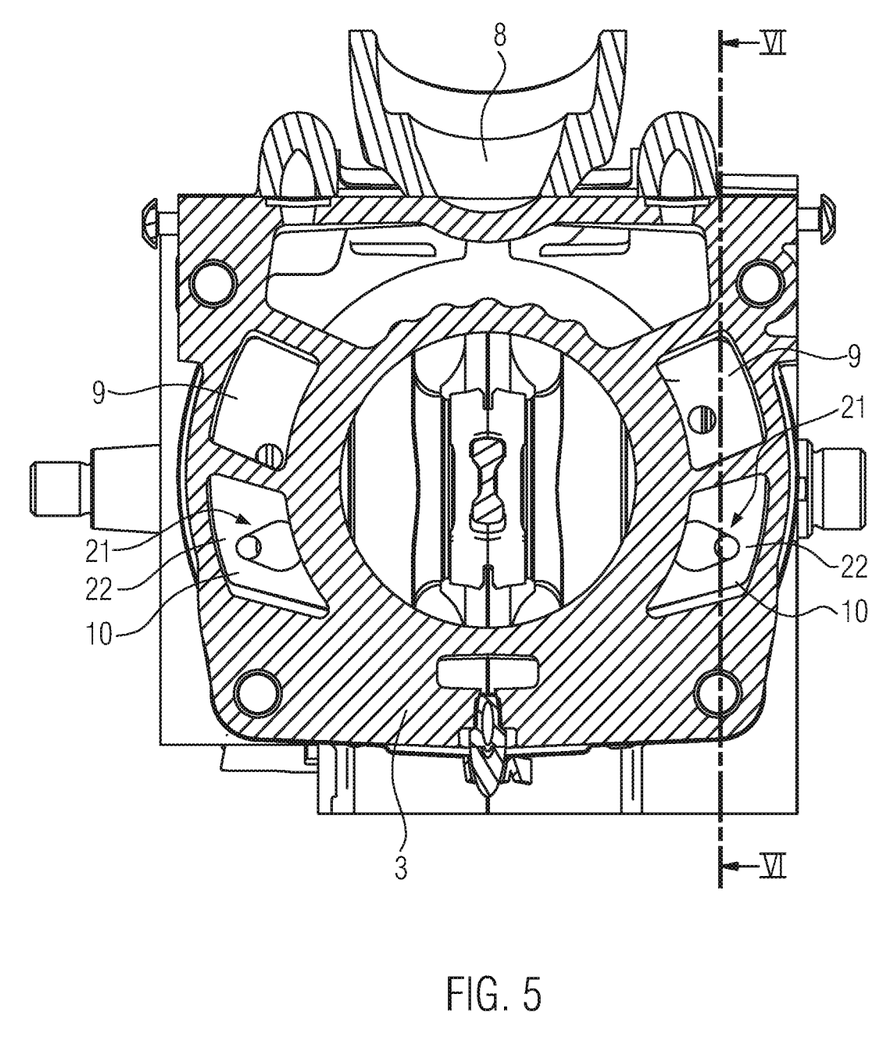
FIG. 5 is a sectional view along line V-V in FIG. 1.

As can be seen in FIG. 5 of the drawings, for example, the cylinder 3 has two first transfer ports 9 and two second transfer ports 10, wherein the first transfer ports 9 are arranged closer in the direction of the outlet 8 than the two second transfer ports 10. The transfer ports 9, 10 are flow-connected to the crank chamber formed inside the crank housing 7, such that compressed air or compressed fuel-air mixture can flow from the crank housing 7 in the direction of the combustion chamber 2 in the event of the downwards movement of the piston 4 in the direction of the crank chamber or the crank housing 7, and can enter the combustion chamber 2 from the transfer ports 9, 10 via overflow windows 11. In the event of the downwards movement of the piston 4 in the direction of the lower dead center UT, the result is thus a fluid flow which is depicted by the arrows 12 depicted in FIG. 3. Attention is paid to the fact that only the transfer port 10 to the right on the drawings plane is depicted freely cut in FIG. 1 of the drawings, while the transfer port 10 to the left on the drawings plan is depicted not cut because of the cutting course. FIG. 3 shows the two transfer ports 10.

As can be seen from FIG. 2 of the drawings, the engine 1 has a first injector 13 and a second injector 14, wherein the first injector 13 opens into the second transfer port 10 on the right hand side in the direction of arrow 15 (when seen according to FIG. 2), and the second injector 14 opens into the second transfer port 10 on the left hand side. The cylinder 3 thus has two injectors 13, 14, which are each formed to inject fuel into the respective transfer port 10 and indeed against the flow direction of fluid from the crank housing 7 via the transfer port 10 in the direction of the combustion chamber 2. Here, the fuel is placed under a system pressure of about 3.5 bar (350000 Pascal 50,7632 PSI), for example, by a feel pump not depicted in more detail.

The internal combustion engine 1 can be operated in different load regions, wherein the load regions extend from low loads in the idle range via average loads to full load.

Figure 8:
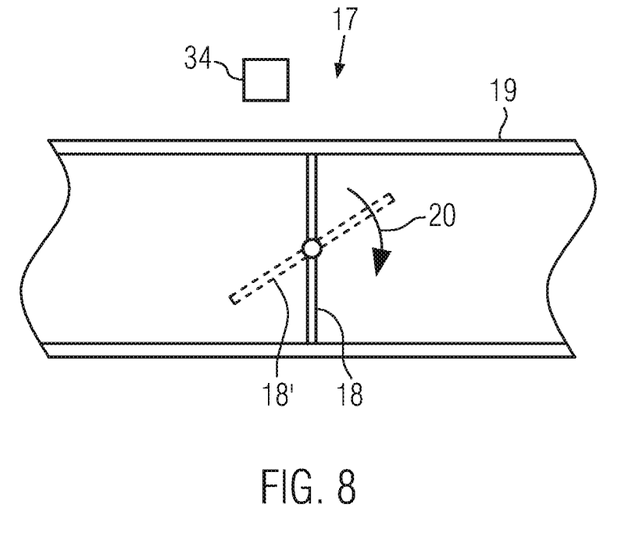
FIG. 8 is a sectional depiction through a schematically depicted throttle flap body.

FIG. 2 of the drawings shows that the engine has a suction support 16 in the inlet region, on which a schematically depicted throttle valve body 17 having a throttle valve 18 pivotable for changing the throughflow cross-section through the throttle valve body 17 is arranged. By means of such pivoting, a user of the two-stroke internal combustion engine 1 can determine a load requirement of the two-stroke internal combustion engine 1. Here, the throttle valve 18 is pivotably received in a housing 19 of the throttle valve body 17, such that the user can change the throughflow cross-section released by the throttle valve 18 via a pivoting movement of the throttle valve 18 in the direction of the arrow 20 according to FIG. 8. Because the throttle valve body 17 has an idle system not depicted in more detail, a throttle valve angle established via a rotation angle sensor 34 schematically depicted in FIG. 8 of zero (0) degrees can correspond to the idle setting, while a throttle valve angle of 72 degrees corresponds to the full load setting depicted in FIG. 8 with the reference numeral 18'.

The internal combustion engine 1 according to the invention is characterized in that, in the event of a first engine load which is lower than a second engine load, the fuel is injected into the transfer port 10 by means of only one injector 13, 14, while in the event of the second engine load, the fuel is injected into the transfer ports 10 by means of the two injectors 13, 14. In other words, this means that the fuel is introduced into the transfer port 10 depending on the engine load with which the two-stroke internal combustion engine 1 is operating—either by means of only one of the injectors 13 or 14, or is introduced by means of both the two injectors 13, 14—wherein it is switched between the operating modes "only one injector" and "the two injectors" depending on the engine load or load requirement.

If the engine is in an operating mode with only low load, the fuel is injected into the transfer port 10 with only one injector 13 or 14 and if the engine load increases, the load is switched to the operating mode of the fuel injection with the two injectors 13, 14 from a threshold value dependent on the speed. If the engine load portrayed by the engine decreases again, it can again be switched from the operating mode of the fuel injection with the two injectors to the operating mode of the fuel injection with only one injector.

Here, the engine load can take place by means of a determination of the crank housing pressure prevailing in the crank housing 7, said pressure depending on the load requirement of the engine set by the user of the engine 1 by means of a change of the throttle valve angle, such that switching between the fuel supply with only one injector or with the two injectors takes place depending on the crank housing pressure.

If only one injector 13, 14 is necessary for fuel supply of the engine 1, then the fuel supply can take place alternatingly by one or the other of the injectors 13, 14 in each case, such that, in a cycle of 360 degrees of the crank shaft angle, the fuel is injected by the injector 13, for example, whereas in the subsequent cycle of 360 degrees of the crank shaft angle, the fuel is injected by the other injector 14. This process has the advantage that the formation of resin or coking on the injectors 13, 14 can be prevented, and furthermore the switching cycles of the injectors 13, 14 are each evenly distributed at about 50 percent.

As can be seen in FIG. 3, the injector 13, just like the injector 14, forms a spray cone 21 as the spray image, and the injectors are arranged in such a way that the spray cone 21 of the fluid flow flowing in the transfer port 10 in the direction of the overflow window 11 runs aligned in the opposite direction thus the danger of wall depositions of the fuel discharged by the spray cone 21 on the wall 22 of the transfer port 10 is reduced. A good fuel preparation is also achieved by the high turbulences prevailing in the transfer port 10, whereby the HC emissions in the exhaust fumes are reduced.

FIG. 5 of the drawings shows the spray cone 21 in its depiction in the transfer port 10 at a distance apart from the wall 22 of the transfer port 10. The fuel injection takes place into the transfer ports 10 spaced apart from the outlet 8 and not into the transfer ports 9 lying closer to the outlet 8, which also have a fluid connection to the crank chamber of the crank housing 7. As a result of the introduction of fuel into the transfer ports 10 away from the outlet, the formation of a short-circuit flow of fuel in the direction away from the outlet 8 is reduced, whereby the flushing losses of the two-stroke internal combustion engine 1 according to the invention are reduced. The specific fuel consumption of the engine can also thus be reduced, and the HC emissions can be reduced, which would otherwise be set with injection of fuel close to the outlet and the resulting wall wetting of the cylinder wall in the region of the outlet 8.

Figure 4:
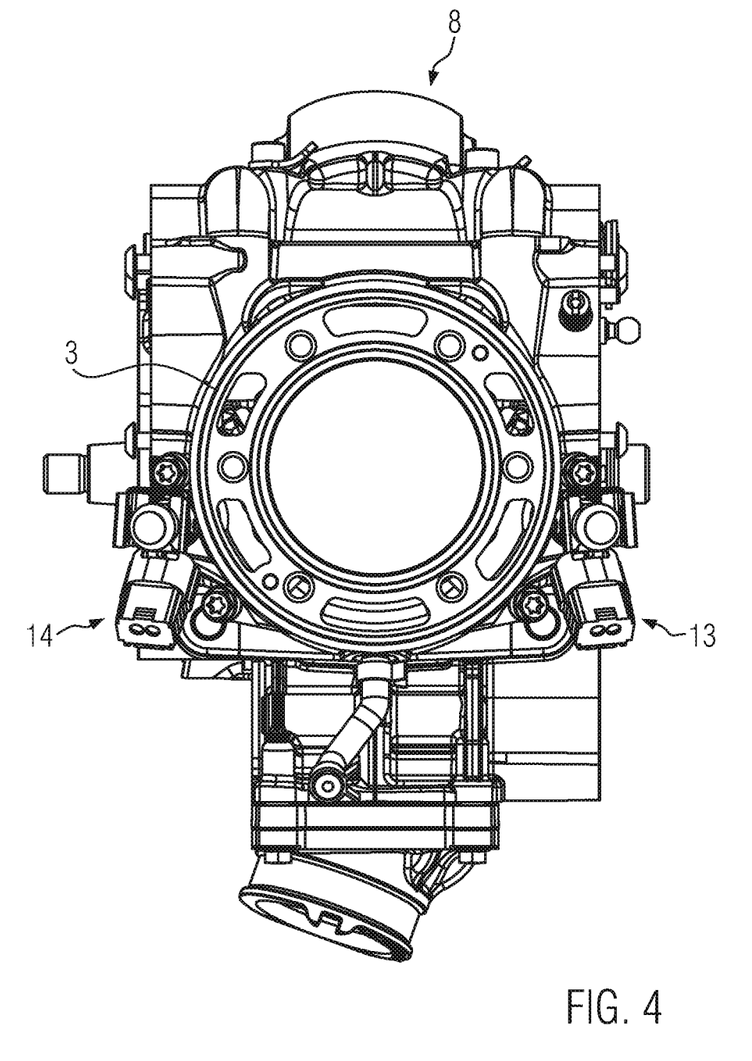
FIG. 4 is a depiction similar to that of FIG. 2 without the cylinder head.

FIG. 4 shows the arrangement of the injectors 13, 14 on the cylinder 3 in a view from above. As can be easily seen, the injectors 13, 14 are both arranged inclined to the cylinder vertical axis 23 that can be seen in FIG. 1 and to the transverse central plane 24 visible in FIG. 2.

In the embodiment of the engine 1 depicted in FIG. 1, an injector 13, 14 is inclined at an angle of 14 degrees with its injector vertical axis 25 relative to the cylinder vertical axis 23. With the depicted engine 1, this configuration leads to the formation of a spray cone 21 avoiding a wall wetting of the wall 22 of the transfer port 10, and indeed in connection with the arrangement of the injector vertical axis 25 relative to the transverse central plane 24 of 15 degrees, as can be seen in FIG. 2 of the drawings.

Figure 6:
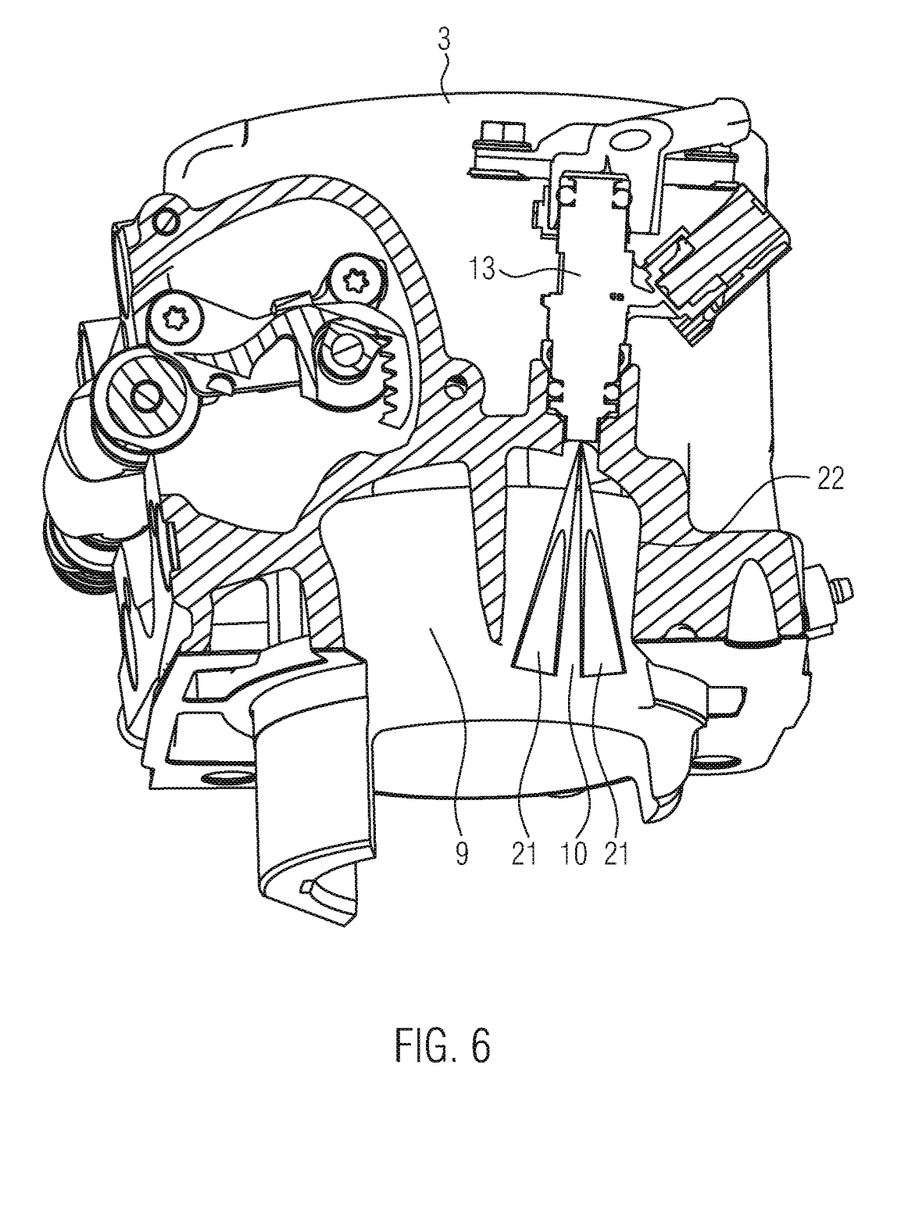
FIG. 6 is a sectional depiction along line VI-VI in FIG. 5.

As can be seen in FIG. 6, the injector 13 or 14 arranged on the cylinder 3 can also form a spray image in the form of two spray cones 21, which prevent a wall wetting of the wall 22 of the transfer port 10.

Figure 7:
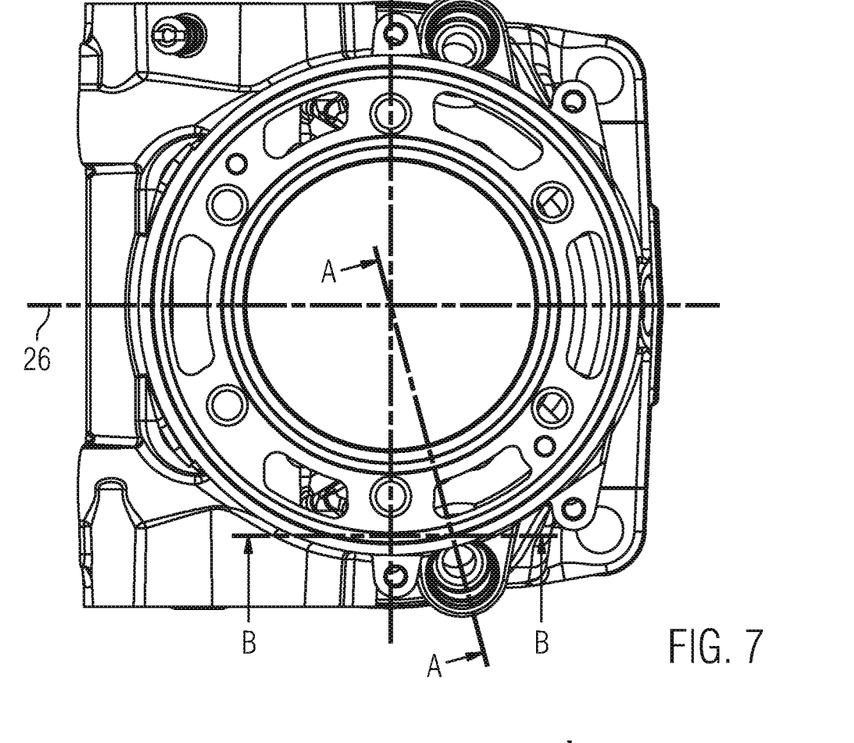
FIG. 7 is a top view of the cylinder of the two-stroke internal combustion engine according to FIG. 1, illustrating the position of two sectional planes A-A and B-B in FIG. 7A and FIG. 7B.
Figure 7A:
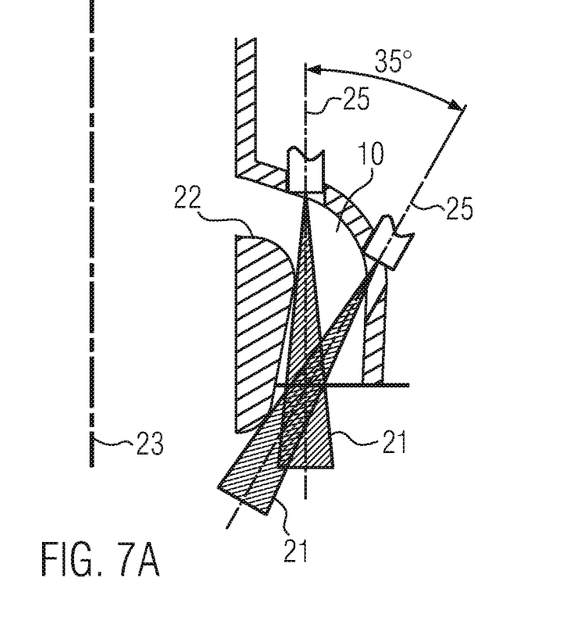
FIGS. 7A and 7B are sectional depictions along lines A-A and B-B, respectively, according to FIG. 7.
Figure 7B:
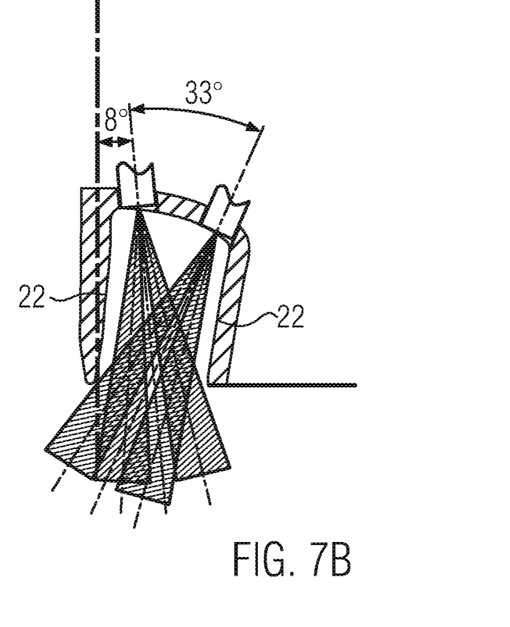

FIG. 7 of the drawings shows two sectional planes A-A and B-B to illustrate the angle of inclination. The angle of inclination is formed between the cylinder vertical axis 23 and the injector vertical axis 25, and which is depicted in FIG. 7A, and to illustrate the angle which the injector vertical axis 25 forms relative to the longitudinal central plane 26 according to FIG. 7 and which is depicted in FIG. 7B. As is depicted by FIG. 7A, the injector 13, 14 can be arranged inclined with its injector vertical axis 25 at an angle of from zero (0) degrees to about 35 degrees relative to the cylinder vertical axis 23, such that the spraying cone 21 does not meet the wall 22 of the transfer port 10. FIG. 7B of the drawings shows the possible arrangement of the injectors 13, 14 relative to a longitudinal central plane 26 receiving the cylinder vertical axis 23, said central plane being visible in FIG. 7. As is obvious, the injectors can be arranged at an angle of minus 8 degrees in relation to the longitudinal central plan 26—starting from a virtual longitudinal central plane with 0 degrees drawn through the injector on the left hand side in FIG. 7B—and starting from this angle, covers an angle region of 33 degrees, without it resulting in wall depositions of the injected fuel on the wall 22 of the transfer port 10. This applies both to the injectors depicted in the drawings having a spray image with two spray cones and to injectors having a spray image with only one spray cone each, similar to the depiction in FIG. 7A.

The two-stroke internal combustion engine 1 according to the invention is furthermore characterized in that the fuel can be injected via one single injector or the two injectors during a partial region of a complete rotation of the crank shaft 6 corresponding to 360 degrees of the crank shaft angle, and indeed depending on the load state of the engine and the rotational speed of the engine. Thus, the invention takes a peculiarity of two-stroke internal combustion engines into consideration, which are characterized in that the engine needs little fuel in the idle region, i.e., with a throttle valve opening angle of extensively from 0 degrees and indeed above the entire speed region from 1,000 rotations per minute to 11,000 rotations per minute with the depicted engine—having a stroke volume of 250 cubic centimeters. This whole speed region can be covered by the supply of fuel by means of only one injector 13, 14 and indeed when the minimum injector opening time is not met, here with increasing speed. Although a two-stroke internal combustion engine of 250 cubic centimeters displacement has been mentioned here, it is also possible that the two-stroke internal combustion engine has a displacement of 125, 150 or even 300 cubic centimeters. This is due to the fact that the engine according to the invention works in the idle range because of the advantageous arrangement of the injectors 13, 14 and with a metered fuel, which is set according to the amount when the injector is actually operated below the injector-specific minimum injector opening time.

With increasing engine load and thus accompanying increase of the throttle valve angle, the fuel requirement of the engine increases. Similarly, the fuel requirement of the engine also increases with increasing engine speed. The engine according to the invention is now formed in such a way that the fuel supply is switched from one injector to the two injectors depending on the speed of the engine in a load region from about 7 percent to about 40 percent of the maximum load. With a high engine speed, the switching of the fuel supply by means of one injector to the fuel supply by means of the two injectors thus already takes place with a low load of 7 percent, for example of the maximum load of the engine, while with low engine speeds, the switching takes place only at 40 percent of the maximum load. If, with low engine speeds, the engine does not meet the value of 40 percent of the maximum load coming from higher load, a switching of the fuel supply from the two injectors to only one injector takes place with low engine speeds only with an engine load of about 7 percent of the maximum load.

The partial region already addressed above of the fuel supply based on the crank shaft angle of 360 degrees can extend from about 5 degrees of the crank angle to about 350 degrees of the crank angle, wherein the partial region in the engine 1 depicted in the drawings assumes a value of about 12 degrees of the crank shaft angle to about 305 degrees of the crank shaft angle, such that, with a throttle valve angle of 0 degrees, the supply of fuel by means of only one injector is sufficient for about 12 degrees of the crank shaft angle, whereas with a throttle valve angle of 72 degrees, for example, which corresponds to the full load setting of the engine, the partial region of the fuel supply by means of the two injectors can extend up to about 305 degrees of the crank shaft angle, with the two injectors; fuel is thus input during a very large partial region of the maximum possible crank shaft angle, i.e. can be worked with injectors, which provide a relatively low specific mass efficiency of fuel per second of 2.5 g/s, for example, i.e. input less fuel per time unit.

This configuration enables the operation of the engine to be ensured even with high loads and high speeds as the result of a sufficient allowance of fuel in the crank housing, since the fuel is not only supplied during the opening time period of the overflow window but also via the transfer ports when the overflow window is sealed by the piston. This enables the high specific fuel consumption with high loads, and high speeds can be taken into account despite the low specific mass performance mentioned above of the injectors of fuel per second, which corresponds to the low specific fuel need of the engine in the low partial load region and idle region; and with high loads and high speeds, a sufficient amount of fuel is quickly available in the combustion chamber, whereby a good internal cooling of the cylinder and of the piston can also be obtained with high loads as a result of the fuel pre-stored in the crank housing.

Figure 9:
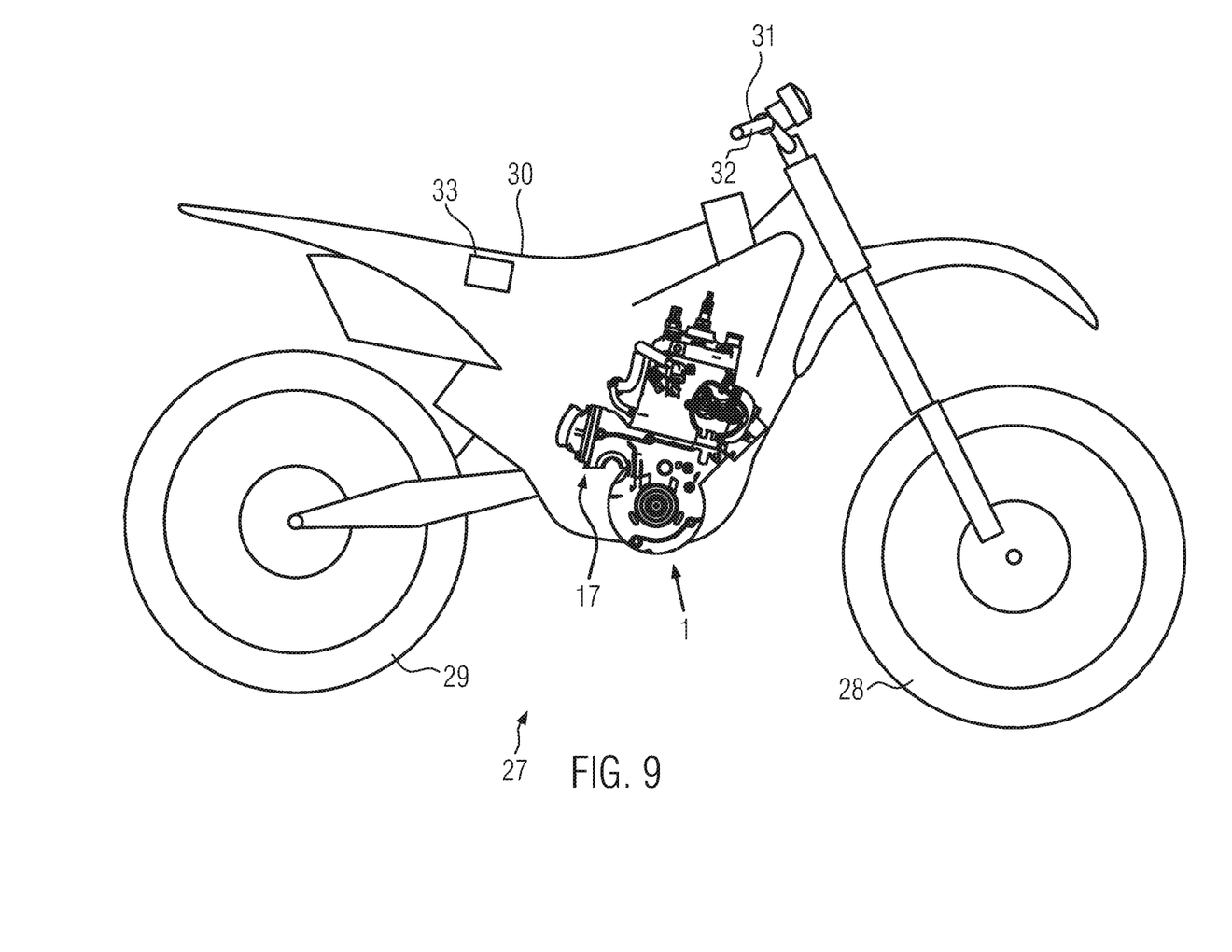
FIG. 9 is a schematic depiction of a motorcycle having the internal combustion engine according to the present invention.

Finally, FIG. 9 of the drawings shows a schematic depiction of a motorcycle 27, which is equipped with the two-stroke internal combustion engine 1 according to the invention. The motorcycle 27 has a front wheel 28 and a rear wheel 29 and a seat surface for the user of the motorcycle in the form of a saddle 30. A user sitting on the saddle 30 or the bench 30 the user can control the motorcycle via the handlebars 31 and here influence the rotation angle setting of the throttle valve 19 arranged in the throttle valve body 17 via the gas twist handle 32 by means of a cable control or also by means of drive-by-wire and thus control the engine load of the engine 1.

If the user leaves the gas twist handle 32 in its unactuated end position, a throttle valve angle of generally zero (0) degrees is set and the engine is operated via the idle system of the throttle valve body 17. A control device 33 that is functionally operated by the internal combustion engine 1, and which is arranged below the bench 30 with the depicted motorcycle 27, controls the injectors 13, 14 in such a way that these provide the fuel necessary for the operation of the engine 1 in an alternating manner in idle mode by injecting into the transfer ports 10.

The load requirement placed on the engine is altered via an actuation of the gas twist handle 32 by the user of the motorcycle 27, and a changed engine load is placed on the engine 1. The change of the throttle valve angle leads to a change of the crank housing pressure measured in the crank housing 7.

The control device 33 calculates the amount of fuel necessary for the throttle valve angle and doses this by means of an injector 13, 14 or by means of the two injectors 13, 14 by the fuel being injected into the transfer ports 10, and indeed either in an alternating manner respectively by one of the two injectors or by the two injectors at the same time, such that the necessary amount of fuel is set. The engine load is changed depending on the throttle valve angle, which is established by the rotation angle sensor 34 and the amount of fuel corresponding to the engine load or the load requirement is ascertained and the opening duration of the injector 13, 14 or the injectors 13, 14 is determined, which then corresponds to a crank shaft angle, which corresponds to a partial region of the crank shaft angle corresponding to a complete rotation of the crank shaft.

With regards to the features of the invention not explained in more detail above, generally, reference is made explicitly to the claims and the drawings.

LIST OF REFERENCE NUMERALS 1 two-stroke internal combustion engine
2 combustion chamber
3 cylinder
4 piston
5 connecting rod
6 crank shaft
7 crank housing
8 outlet
9 first transfer ports
10 second transfer ports
11 overflow window
12 arrow
13 first injector
14 second injector
15 arrow
16 suction support
17 throttle valve body
18 throttle valve
19 housing
20 arrow
21 spray cone
22 wall
23 vertical axis
24 transverse central plane
25 injector vertical axis
26 longitudinal central plane
27 motorcycle
28 front wheel
29 back wheel
30 saddle, bench
31 handlebars
32 gas twist handle
33 control device
34 rotation angle sensor

We claim:

1. A two-stroke internal combustion engine having at least one cylinder provided with a combustion chamber and an outlet, and having a crank housing provided with a crank shaft,
    said housing being flow-connected to the combustion chamber via at least two transfer ports, wherein the internal combustion engine comprises at least two injectors, and fuel is introducible by means of only one of the injectors with a first engine load and by means of two injectors with a second engine load,
    wherein the internal combustion engine comprises at least two transfer ports per cylinder, each transfer port being provided with one of the injectors, and
    the internal combustion engine is adapted for injecting fuel by means of the injectors into the transfer ports generally against an overflow direction from the crank housing into the combustion chamber.

2. The two-stroke internal combustion engine according to claim 1, wherein the internal combustion engine is adapted for the injection of fuel by means of alternating ones of the two injectors.

3. The two-stroke internal combustion engine according to claim 1, wherein the internal combustion engine is adapted to inject fuel within a crank shaft angle, which corresponds to a part of a complete rotation of the crank shaft, and the part is between about 5 degrees of the crank shaft angle and about 350 degrees of the crank shaft angle.

4. The two-stroke internal combustion engine according to claim 3, wherein the part of a complete rotation of the crank shaft is between about 10 degrees of the crank shaft angle and about 330 degrees of the crank shaft angle.

5. The two-stroke internal combustion engine according to claim 4, wherein the part of a complete rotation of the crank shaft is between about 12 degrees of the crank shaft angle and about 305 degrees of the crank shaft angle.

6. The two-stroke internal combustion engine according to claim 1, wherein the internal combustion engine is adapted to inject fuel by means of only one of the two injectors in a region of the engine load of the internal combustion engine from about 7 percent to about 40 percent of a maximum load of the internal combustion engine.

7. The two-stroke internal combustion engine according to claim 1, wherein the internal combustion engine is adapted to inject fuel within a part of a crank shaft angle corresponding to a complete rotation of the crank shaft, said part increasing with an increasing rotational speed of the internal combustion engine.

8. The two-stroke internal combustion engine according to claim 1, wherein the internal combustion engine is functionally coupled to a control device, and
    the control device is adapted to set a load requirement of the internal combustion engine, and
    the injection of fuel takes place by means of one of the two injectors or the two injectors depending on the set load requirement.

9. The two-stroke internal combustion engine according to claim 8, wherein a setting of the load requirement occurs by means of a determination of an opening of a throttle organ pre-stored upstream of the internal combustion engine.

10. The two-stroke internal combustion engine according to claim 8, wherein the internal combustion engine is adapted for changing a start of the injecting of fuel by means of one of the two injectors or both the two injectors, or a time duration of an opening actuation of one or two of the two injectors, depending on the set load requirement or a rotational speed of the internal combustion engine.

11. The two-stroke internal combustion engine according to claim 1, wherein the cylinder is provided with two first transfer ports and two second transfer ports, and the second transfer ports are arranged spaced further apart from the outlet than the first transfer ports, and the injectors are arranged for injecting fuel into the second transfer ports.

12. The two-stroke internal combustion engine according to claim 1, wherein the internal combustion engine has a cylinder vertical axis within a longitudinal central plane of the cylinder, and each injector has an injector vertical axis formed by a longitudinal central plane of the injector, and the injectors are arranged at an angle between the cylinder vertical axis and the injector vertical axis from about zero degrees to about 35 degrees.

13. The two-stroke internal combustion engine according to claim 12, wherein the angle between the cylinder vertical axis and the injector vertical axis is about 14 degrees.

14. The two-stroke internal combustion engine according to claim 13, wherein the injectors are arranged inclined at an angle between the longitudinal central plane and the injector vertical axis of about minus 8 degrees to about plus 33 degrees.

15. The two-stroke internal combustion engine according to claim 1, wherein each of the injectors is arranged relative to a respective transfer port so that additions of the fuel injected by the injector into the respective transfer port on a wall of the transfer port are extensively avoided.

16. The two-stroke internal combustion engine according to claim 1, wherein at least one of the injectors generates at least one conical fuel jet, and the at least one injector is aligned relative to at least one of the transfer ports to avoid wall depositions of the fuel jet on the wall of the at least one transfer port.

17. A method for operating a two-stroke internal combustion engine, which has at least one cylinder provided with two transfer ports, a combustion chamber and an outlet, and has a crank housing provided with a crank shaft, said housing being flow-connected to the combustion chamber via the two transfer ports, the method comprising:

introducing fuel to the internal combustion engine via two injectors, wherein the fuel is introducible via only one of the injectors during a first engine load, and via the two injectors during a second engine load, wherein the introducing is by means of the injectors into the transfer ports against an overflow direction from the crank housing into the combustion chamber.

18. A motorcycle having a riding saddle and a front wheel and a rear wheel, characterized by a two-stroke internal combustion engine according to claim 1.

\* \* \* \* \*